US009207755B2

(12) United States Patent
Byrnes et al.

(10) Patent No.: US 9,207,755 B2
(45) Date of Patent: Dec. 8, 2015

(54) METHOD AND SYSTEM FOR EMOTION TRACKING, TAGGING, AND RATING AND COMMUNICATION

(71) Applicants: Patrick Joseph Byrnes, Chicago, IL (US); Steven Carl Landers, Willeton (AU)

(72) Inventors: Patrick Joseph Byrnes, Chicago, IL (US); Steven Carl Landers, Willeton (AU)

(73) Assignee: Iconicast, LLC, Wheaton, IL (US)

( * ) Notice: Subject to any disclaimer, the term of this patent is extended or adjusted under 35 U.S.C. 154(b) by 0 days.

(21) Appl. No.: 13/720,501

(22) Filed: Dec. 19, 2012

(65) Prior Publication Data

US 2013/0154980 A1 Jun. 20, 2013

Related U.S. Application Data

(60) Provisional application No. 61/578,221, filed on Dec. 20, 2011.

(51) Int. Cl.
*G06F 3/041* (2006.01)
*G06F 3/01* (2006.01)
*G06F 3/0482* (2013.01)

(52) U.S. Cl.
CPC *G06F 3/01* (2013.01); *G06F 3/041* (2013.01); *G06F 3/0482* (2013.01)

(58) Field of Classification Search
CPC .................. G06F 17/30032; G06F 3/0481
USPC ..................... 715/753, 763, 839; 706/12
See application file for complete search history.

(56) References Cited

U.S. PATENT DOCUMENTS

| 6,064,383 | A | * | 5/2000 | Skelly | G06T 11/00 715/758 |
| 2006/0078226 | A1 | * | 4/2006 | Zhou | G06T 3/0018 382/298 |
| 2011/0039295 | A1 | * | 2/2011 | Lok | A61B 5/14532 435/29 |
| 2012/0035428 | A1 | * | 2/2012 | Roberts | A61B 5/165 600/300 |

OTHER PUBLICATIONS

Cahill et al. (IBM Technical Disclosure Bulletin vol. 37, No. Jan. 1, 1994 p. 199-200).*
Lottridge (Lottridge, Danielle. "Evaluating Human Computer Interaction through Self-rated Emotion." Human-Computer Interaction—Interact 2009 (Jan. 1, 2009): 860-63. [serialonline], [retrieved on Mar. 17, 2015]. Retrieved from the Internet <URL: http://download.springer.com>.*
Breazeal (Breazeal, Cynthia. "Emotion and Sociable Humanoid Robots." International Journal of Human-Computer Studies 59.2003 (2003): 119-55. [serialonline], [retrieved on Mar. 17, 2015]. Retrieved from the Internet <URL: http://www.ohio.edu>.*

(Continued)

*Primary Examiner* — Kent Chang
*Assistant Examiner* — Mark Edwards
(74) *Attorney, Agent, or Firm* — Charles E. Kruger

(57) ABSTRACT

A system provides a user an interactive graphic software interface to navigate to an image representative of any particular emotion from within a matrix containing representations of a continuous range of emotional states. The user can then send the selected image to one or more other users or to aggregator servers in order to communicate emotions or to tag or rate various things with emotional significance, so that quantitative statistics on emotional significance can be computed for those things. The system can also be used to track emotional state through a range of time periods or geospatial locations.

5 Claims, 11 Drawing Sheets

(56) References Cited

OTHER PUBLICATIONS

Designing Sociable Robots (Intelligent Robotics and Autonomous Agents series) by Cynthia Breazeal (2004) p. 1 of NPL document EmotionSpaceReferences.pdf.
Robert Plutchik•s "Wheel of Emotions" (1980) p. 2 of NPL document EmotionSpaceReferences.pdf.
Emotions and Facial Expressions by Joumana Medlej (Cedarseed.com, 2007) p. 3 of NPL document EmotionSpaceReferences.pdf.
An "Emotional States" diagram, found on Humaine Association•s www.emotional-research.net and attributed to Klaus Scherer et al, University of Geneva (no date) p. 4 of NPL document EmotionSpaceReferences.pdf.
What are emotions? And how can they be measured? Klaus B. Scherer located on the internet at http://lep.unige.ch/system/files/biblio/2005_Scherer_SSI.pdf NPL document 2005_Scherer_SSI.pdf.

* cited by examiner

METHOD AND SYSTEM FOR EMOTION TRACKING, TAGGING, AND RATING AND COMMUNICATION

RELATED APPLICATIONS

This application claims priority from a provisional application entitled METHOD AND SYSTEM FOR EMOTION TRACKING, TAGGING, RATING AND COMMUNICATION, Application No. 61/578,221, filed Dec. 20, 2011, which is hereby incorporated by reference for all purposes.

BACKGROUND OF THE INVENTION

Many researchers over the years have attempted to create spatial maps of emotional states in an attempt to better characterize and understand human emotion.

"Emotions and Facial Expressions" by Joumana Medlej (Cedarseed.com, 2007) is a two-dimensional model of the author's perceived relationships between five families of emotional expression (sadness, anger, smile, surprise and relaxation). The model is constructed as forked branches radiating from a central "blank" state, following no apparent meaningful vector, and extending to the extremities of each of the five branches. The diagram consists of 59 emotional states, depicted both verbally and visually.

Robert Plutchik's "Wheel of Emotions" (1980) is a two-dimensional model presenting 8 basic emotions as the core of a radial diagram (ecstasy, admiration, terror, amazement, grief, loathing, rage and vigilance) with each radius extending through two diminishing degrees of each emotion. Interposed between the 8 radial spokes are 8 "advanced" emotions (love, submission, awe, disapproval, remorse, contempt, aggressiveness and optimism), each being defined as the fusion of the basic emotions on either side. A three dimensional version of the wheel has also been published, with the wheel being folded into the form of a cone; but the conical version squeezes out the advanced emotions and creates three-dimensional discontinuities along the newly formed linear axis. The wheel consists of 32 emotional states, depicted verbally, 24 of which have a uniform radial distribution within the chart.

An "Emotional States" diagram, found on Humaine Association's www.emotional-research.net and attributed to Klaus Scherer et al, University of Geneva (no date), is a two-dimensional model with a stochastic distribution of emotional states. Four axes (active-passive, positive-negative, hi power control-lo power control, obstructive-conducive) cut through the circular chart, suggesting eight regions of equal size, though the regions carry no specified designations. The chart lists 111 emotional states, depicted verbally, though with some redundancy and several apparent contradictions (presumably due to transcription).

Designing Sociable Robots (Intelligent Robotics and Autonomous Agents series) by Cynthia Breazeal (2004) provides the only truly three-dimensional model—but includes only 10 very basic emotional states. This 3D "emotion space" was constructed for a study at MIT to allow a robotic face, "Kismet," to express emotions. The 10 emotions include the psychologist Paul Ekman's Six Basic Emotions (described as universal his 1972 study of the Fore tribe of Papua New Guinea, seeking to determine if facial expression was cultural or innate)—anger, disgust, fear, happiness (called "content" in the MIT study), sadness and surprise—plus four others—stem, accepting, tired and calm. The model was constructed to integrate the functions of the servo motors controlling the robotic face and provide fluidity in the mechanical transitions between facial expressions (so as not to disturb the child subjects interpreting them). The servos performed essentially three functions, controlling three variables of motion—defined as valence, arousal and stance. The polar extremes of these functions define the three axes of the emotion space: "happy" and "unhappy" define the valence axis, "tired" and "surprise" define the arousal axis, and "stern" and "accepting" define the stance axis. The nexus of these three axes is the zero point, which yields a neutral expression, labeled "calm." Only three states lie off-axis (with their precise metrics undefined in the report) to show any interaction between variables: "disgust" (low arousal, closed stance, negative valence), "anger" (high arousal, closed stance, negative valence) and "fear" (high arousal, open stance, negative valence). The 10 emotional states are, for practical purposes, depicted.

While such systems for creating spatial maps of emotional states exist, no systems are known by the inventors which provide an interactive graphic software interface to navigate to an image representative of any particular emotion from within a matrix containing representations of a continuous range of emotional states, to allow a user to communicate emotions or to tag or rate various things with emotional significance, so that quantitative statistics on emotional significance can be computed for those things.

A variety of systems exist for very limited communication of emotion through limited bandwidth connections. These involve the use of emoticons, or emoji, which are highly abstracted iconifications of particular discrete emotions. Such systems range from widely-known user messaging conventions such as using the character sequence to represent a smiling face, or ;-) to represent a winking and smiling face, to systems like the Skype VOIP and chatting software package, which provides a palette of emoticon images that the user can place into messages.

Such systems are limited in that they at least do not provide the capability to interactively navigate through a series of images intended to represent a scientifically-valid multidimensional continuum covering the full breadth of emotional feelings.

Systems exist for allowing large numbers of users to tag places, people and things with ratings of various types. A few examples of such systems include such geospatial rating systems as Yelp, Google Maps, and Foursquare. These existing systems are limited in that they at least do not provide the user with an interactive graphic software interface to navigate to an image representative of any particular emotion from within a matrix containing representations of a continuous range of emotional states.

BRIEF SUMMARY OF THE INVENTION

One embodiment of the invention is an apparatus for visually depicting an emotional state, the apparatus comprising a computing system including a processor coupled to a display screen and one more user input devices with the processor configured to display a facial expression image on the display screen, with the facial expression image in the form of a background shape having graphic indicia of facial features displayed within the background shape, where facial features indicated by the graphic indicia include at least a mouth, a pair of eyes and a pair of eyebrows, accept a first signal from the one or more of the user input devices indicating a polarity value, selected from a plurality of polarity values, of an emotional state to be depicted by a facial expression image, with the polarity value controlling whether the emotional state causes the facial expression image depicting the emotional state to tend toward a smile or a frown, change the shape and position of the graphic indicia of the facial features on the facial expression image to express an emotional state characterized by a received polarity value, accept a second signal from the one or more of the user input devices indicating an activity value, selected from a plurality of activity values, of an emotional state to be depicted by a facial expression image, with the activity value controlling whether the emotional state causes the facial expression image depicting the emotional state to express an emotional stating tending toward being either active or extroverted at one end of a continuum or passive or introverted at the other end of the continuum, change the shape and position of the graphic indicia of the facial features on the facial expression image to express an emotional state characterized by a received activity value, accept a first signal from the one or more of the user input devices indicating a receptivity value, selected from a plurality of receptivity values, of an emotional state to be depicted by a facial expression image, with the receptivity value controlling whether the facial expression image depicting the emotional state is harder and more pinched or softer and more open and change the shape and position of the graphic indicia of the facial features on the facial expression image to express an emotional state characterized by a received receptivity value.

Another embodiment of the invention is an apparatus for visually depicting an emotional state, the apparatus comprising a memory storing a three-dimensional array of facial expression images, with each facial expression image in the array expressing an emotional state characterized by the values of first, second and third array index values, with the first array index value being a polarity value indicating whether the emotional state causes facial expression image depicting the emotional state to tend toward a smile or a frown, with the second array index value being an activity value indicating whether the emotional state causes the facial expression image depicting the emotional state to express an emotional stating tending toward being either active or extroverted at one end of a continuum or passive or introverted at the other end of the continuum and with the third array index value being a receptivity value indicating whether the depiction of the emotional state in the facial expression image is harder or more pinched or softer and more open, a computing system including a processor coupled to a display screen, the memory and one more user input devices with the processor configured to accept a first signal from the one or more user input devices to a select a value of one of said first, second or third array index values, displaying, in response to the first signal, a grid of facial expression image characterized by a selected value of an array index value and by a range of non-selected array index values, accepting second a signal to select a facial expression displayed in the grid to indicate an emotional state.

A server computer coupled by one or more communication links to at least one remote computing system comprising a memory holding emotional-state-depicting program code for execution on a remote computing system, with the emotional-state-depicting program configured, when executed by a processor of the computing system, to cause the computing system to display a facial expression image on a display screen of the computing system, with the facial expression image in the form of a background shape having graphic indicia of facial features displayed within the background shape, where facial features indicated by the graphic indicia include at least a mouth, a pair of eyes and a pair of eyebrows, accept a first signal from the one or more of the user input devices of the computing system indicating a polarity value, selected from a plurality of polarity values, of an emotional state to be depicted by a facial expression image, with the polarity value controlling whether the emotional state causes the facial expression image depicting the emotional state to tend toward a smile or a frown, change the shape and position of the graphic indicia of the facial features on the facial expression image to express an emotional state characterized by a received polarity value, accept a second signal from the one or more of the user input devices indicating an activity value, selected from a plurality of activity values, of an emotional state to be depicted by a facial expression image, with the activity value controlling whether the emotional state causes the facial expression image depicting the emotional state to express an emotional stating tending toward being either active or extroverted at one end of a continuum or passive or introverted at the other end of the continuum change the shape and position of the graphic indicia of the facial features on the facial expression image to express an emotional state characterized by a received activity value, accept a first signal from the one or more of the user input devices indicating a receptivity value, selected from a plurality of receptivity values, of an emotional state to be depicted by a facial expression image, with the receptivity value controlling whether the facial expression image depicting the emotional state is harder and more pinched or softer and more open and change the shape and position of the graphic indicia of the facial features on the facial expression image to express an emotional state characterized by a received receptivity value and the server computer further comprising a controller, coupled to the memory, configured to receive a request from the remote computing system over a communication link requesting a transfer of the emotional-state-depicting program code and configured to respond the request to transfer the emotional-state-depicting program code to the remote system.

Still other applications of the present invention are possible, as disclosed in the specification, below.

DETAILED DESCRIPTION OF THE INVENTION

Figure 1:
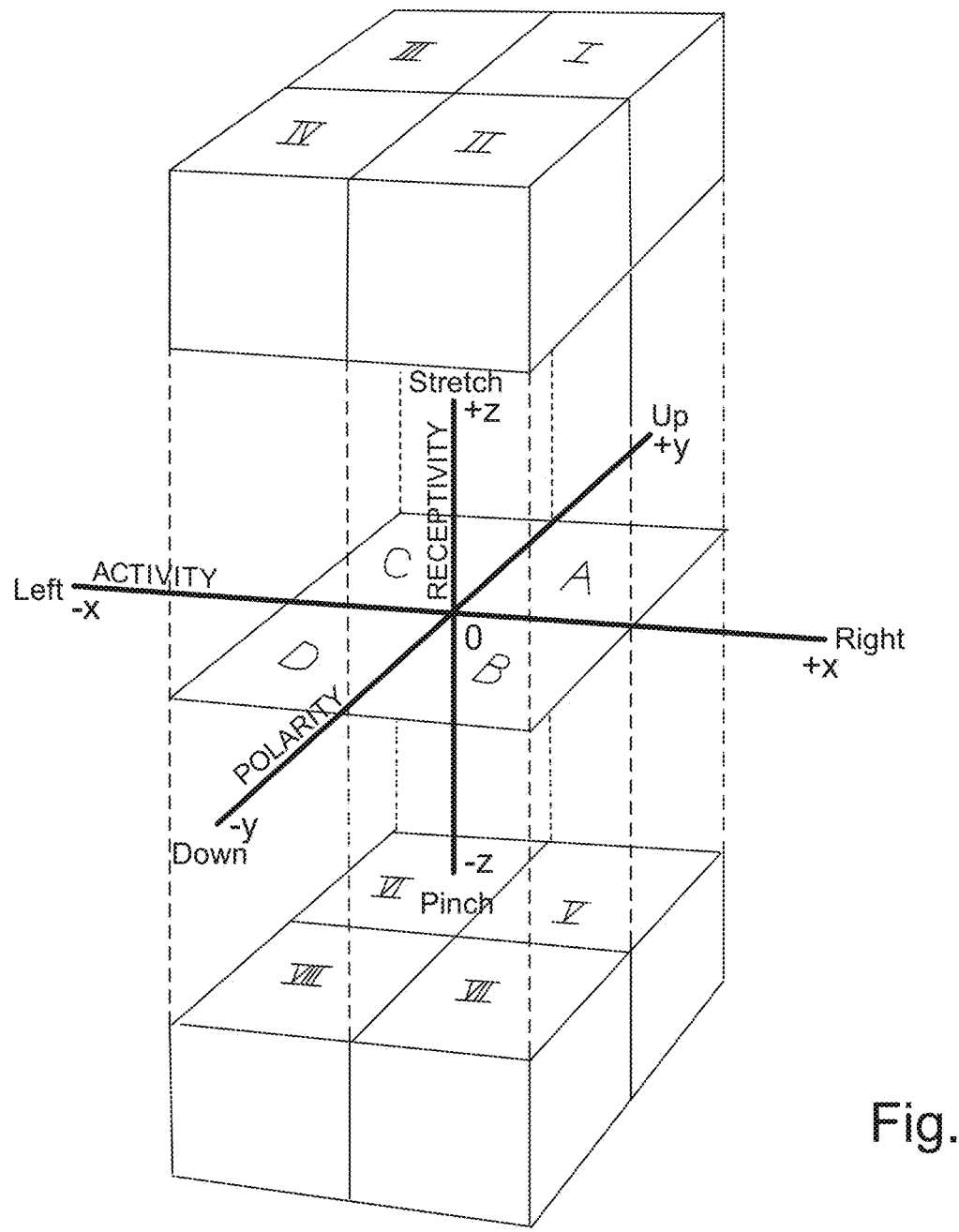
FIG. 1 illustrates an example of a 3-dimensional emotional state matrix.

Various embodiments provide a mobile computer software interface whereby a user can interactively navigate through a multidimensional series of facial expression images designed to represent a scientifically-valid continuum covering the full breadth of human emotional feelings. Each facial expression image occupies a position in a three-dimensional matrix, whereby each axis of the matrix corresponds to a continuous range of emotions.

The user is initially presented with a single neutral expression that represents the middle point of the matrix. Navigation is via user gestures on top of the face. Swiping the user's finger up, for example, moves to a facial expression image with a higher y value, which corresponds to happier, more positive, emotion. Swiping down moves to a less happy, more negative, image. Swiping to the left corresponds to a lower x value, which is a more passive emotion, while swiping to the right corresponds to a more active emotion. Pinching on the image lowers the z value, corresponding to a more closed, squashed expression. Spreading the fingers apart, on the other hand, increases the z level, and moves to a more open, stretched expression.

Since interactive navigation causes the displayed facial expression image to be rapidly replaced with the facial expression image corresponding to the underlying coordinate as the user navigates around the matrix, the result is that the user sees what appears to be a single face, morphing between various emotions, as the user moves around the space. This makes for an enjoyable, intuitive, and easy to use navigation system. In the following the navigation system will be described, by way of example, not limitation, as the Smurks® system.

Additional facial expression images are provided that don't fit neatly into such an emotional continuum. For example, these include situation facial expression images corresponding to circumstances such as "I'm on the phone" or "let's get a beer" or "I win!" It also includes images that correspond to other non-verbal cues, such as "I don't feel well." The user can navigate to these images by clicking on the "More" button, which brings up the Wurk Smurks® interface (seen above).

In addition, the system provides for random selection of the facial expression image by having the user shake the phone, causing one of several "Jurk facial expression images" to be selected. These are useful for entertainment purposes, and for playing games.

The three dimensional matrix of emotional states used to navigate between facial expression images in the Smurks® system will now be described in more detail with reference to FIGS. 1-3.

Two axes of the matrix are analogous to the familiar Valence and Arousal axes used in other emotional maps and measures. The third axis in the Smurks® system, however, sufficiently distorts the traditional meanings of those terms, in some cases even inverting them, that we have adopted an alternative convention to avoid confusion.

The three axes in the Smurks® system are therefore labeled Polarity, Activity, and Receptivity. In FIG. 1, the Polarity axis is the y-axis which maps to a vertical swipe of the displayed facial expression image, the Activity axis is the x-axis which maps to a horizontal swipe of the displayed facial expression image, and the Receptivity axis is the z-axis which maps to pinching or stretching the displayed facial expression image. Thus, each point in the matrix is mapped to a Polarity value, an Activity value and a Receptivity value and corresponds to an outward expression of the emotion indicated by the coordinate values of the matrix point.

Referring first to the Polarity (y) axis, throughout most of the matrix Polarity correlates closely to Valence. The difference is that Valence is generally equated with attractiveness, whereas Polarity refers only to the outward affect of the expression—tending toward a smile or toward a frown. Attraction in the facial expression image matrix is more a combination of Polarity and Receptivity. In FIG. 1 the origin of the matrix is mapped to an emotionally neutral state. The Polarity value increases as the absolute value of y increases in the positive direction and the Polarity value decreases as the absolute value of y increases in the negative direction. As y increases in the positive direction the expression tends toward a smile and as y increases in the negative direction the expression tends to a frown.

Referring next to the Activity (x) axis, Activity is very akin to Arousal in most instances. However, again, Receptivity contains elements that affect the way Arousal would be traditionally interpreted. Activity, on the other hand, can suggest either arousal or the sense of being active (as opposed to passive). In one example embodiment, this axis is designed to correspond to the iPod's right-left control of audio volume, which was the analogy used to help users relate to this dimension. Throughout the matrix, it can variously be described as loud versus soft, extroverted versus introverted, active versus passive, outward versus inward, or any similar contrast—all of which generally fall under the broad heading of Activity. The Activity value increases as the absolute value of x increases in the positive direction and the Activity value decreases as the absolute value of x increases in the negative direction. As x increases in the positive direction the expression tends toward being more active and as x increases in the negative direction the expression tends to toward being more passive.

Referring finally to the Receptivity (z) axis, Receptivity is the dimension that will be most unfamiliar to persons knowledgeable of prior art systems. Receptivity is easiest to understand in the manner in which it is graphically represented. Receptive expressions are open—the eyebrows go up, the face softens or stretches. Expressions with negative receptivity are closed or oppositional—the eyebrows go down, the face hardens or becomes pinched. In one example embodiment, this dimension was designed to be operated by the pinch and stretch finger gestures on the iPhone®. The Receptivity value increases as the absolute value of z increases in the positive direction and the Receptivity value decreases as the absolute value of z increases in the negative direction. As z increases in the negative direction the expression tends toward being more hardened or pinched and as z increases in the positive direction the expression tends toward being more softened or stretched.

In an example embodiment, seven intervals were plotted along each axis, creating what is essentially a seven-point scale in three dimensions. There are 343 facial expression images in all (7×7×7). The facial expression images that lie on any line parallel to an axis should animate like a short film strip consisting of seven frames, going from one extreme of a dimension to the other. The matrix as a whole is the resultant interlocking mesh of those 147 individual seven-point scales.

Within this matrix are many different zones, characterized by broad descriptors of common emotions; e.g., happy, sad, angry, blissful, cynical, hurt, confident, scared, etc. In one embodiment of Smurks® system, these zones are roughly conical in shape, centered on the axes and radii extending to the corners of the cubic matrix, resulting in 14 zones of emotion.

Due to the complexity of the borders of these conic zones, however, it is easier to describe the interpretation of facial expression images according to its dimensional components. Hence, in this example embodiment the interpretive zones correspond to the axes, the off-axis quadrants of the axial planes, and the off-axial octants of the three-dimensional space. This yields 26 zones (or 27 if the point at intersection of the axes is counted, which is the location of the neutral state, balanced in polarity, activity and receptivity).

Below is a description of each of these zones, with a list of the sorts of emotional states expected to be found in these zones.

Due to the subjectivity in assigning labels to facial expressions, and due to the many subtle shades and nuances of nonverbal facial communication, often fluctuating in different contexts, we have refrained from assigning "definitive" labels to facial expression images. Instead we offer only a range of descriptors that might apply to the facial expression images in a zone, without assigning them to specific facial expression images. The grouping of descriptors should be sufficient for characterizing the zones and the meaning of the facial expression images therein.

Twenty-six interpretive zones will now be described. The first six zones describe one-dimensional movement along an axis.

The Axes

ZONE 1—Movement in the positive y direction from y=1 to y=3: Positive Polarity, Neutral Activity, Neutral Receptivity (up). This is a short progression of three facial expression images (each of the six axial zones consists of a mere three facial expression images) in an escalating mood with rather balanced activity and receptivity. The emotional states along this axis might be described variously as shades of: EASY-GOING, GLAD, and PLEASED.

ZONE 2—Movement in negative y direction from y=−1 to y=−3: Negative Polarity, Neutral Activity, Neutral Receptivity (down). These facial expression images are also balanced in activity and receptivity, and express a straightforwardly negative mood. Such feelings may be regarded as simple shades of: BLUE and SAD.

ZONE 3—Movement in the positive x direction from x=1 to x=3: Neutral Polarity, Positive Activity, Neutral Receptivity (right). The positive activity lacks both a polar and receptive bias. Thus it is energy without any other direction. The emotional consequences are understandably: PUZZLED and STUNNED.

ZONE 4—Movement in the negative y direction from y=−1 to y=−3: Neutral Polarity, Negative Activity, Neutral Receptivity (left). This is enervation with no polar or receptive bias. Emotional states along this radius might be described as: SO-SO, UNDECIDED and TIRED.

ZONE 5—Movement in positive z direction from z=1 to z=3: Neutral Polarity, Neutral Activity, Positive Receptivity (stretch). The open disposition without polar or active bias describes emotions like: ATTENTIVE and OPEN-MOUTHED (AWED).

ZONE 6—Movement in the negative z direction form z=−1 to z=−3: Neutral Polarity, Neutral Activity, Negative Receptivity (pinch). The closed disposition with neither a polar or active skew generates expressions that appear: SERIOUS and STERN.

Axial Planes

Due to the limitations of representing a 3-dimensional matrix in a 2-dimensional drawing all of the axial planes are not depicted in FIG. 1. Only the four quadrants of the x-y plane are depicted and will now be described. In each of the depicted quadrants the value of the Receptivity (z) coordinate is zero and, in this example, the values of the x and y coordinates range from −7 to +7. Each axial plane represents a space where the value of one coordinate is held to zero and the values of the other coordinates take values from 1 to 3 or −1 to −3. There are twelve axial plane zones.

ZONE 7 (Quadrant A): Movement between x=0 to 3, y=0 to 3 and with z=0: Positive Polarity, Positive Activity, Neutral Receptivity (up-right). The positive mood with active energy, but no discernible bias toward or against its object, engenders expressions you might regard as: SMIRKING, BEMUSED, SILLY and JOVIAL.

ZONE 8 (Quadrant B): Movement between x=0 to 3; y=0 to −3 and with z=0: Negative Polarity, Positive Activity, Neutral Receptivity (down-right). The negative mood that is aroused but has no receptive bias results in conflicted emotions of a negative impulse with no sure direction, such as in feelings that are: UNCERTAIN, SQUEAMISH, SHOCKED, FRANTIC and BLENCHING.

ZONE 9 (Quadrant C): Movement between x=0 to −3; y=0 to 3 and with z=0: Positive Polarity, Negative Activity, Neutral Receptivity (up-left). An up disposition with more introverted activity and a neutral receptive interest results in a fairly relaxed mood that would include such emotional states as: CALM, MELLOW, GLOATING, DAYDREAMY, BASHFUL, SHY and VACANT SMILE.

ZONE 10 (Quadrant D): Movement between x=0 to −3; y=0 to −3 and with z=0: Negative Polarity, Negative Activity, Neutral Receptivity (down-left). Negative moods with an inward focus or low energy and a relative receptive indifference might include such states as: DUBIOUS, REGRETFUL, SUBDUED, SAD, BEAT, DEFEATED and DEJECTED.

Figure 2:
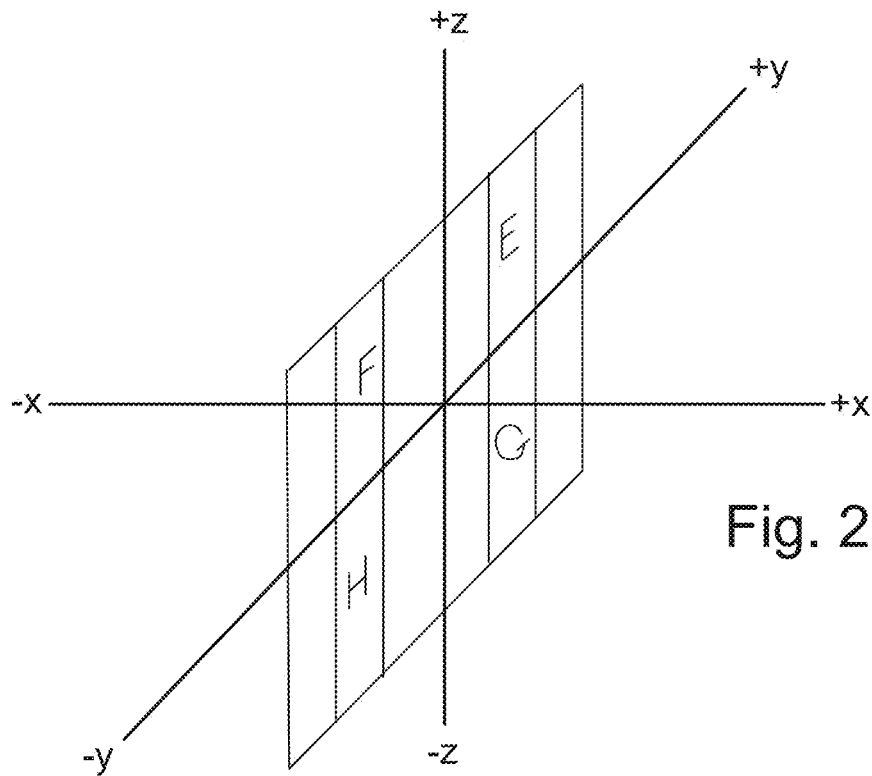
FIGS. 2 and 3 illustrate examples of 2-dimensional axial planes of an emotional state matrix.

FIG. 2 depicts the four quadrants (E-G) where the value of the Activity(x) coordinate is zero.

ZONE 11 (Quadrant E): Movement between y=0 to 3; z=0 to 3 and with x=0: Positive Polarity, Neutral Activity, Positive Receptivity (up-stretch). A positive affect with an open attitude and neutral activity could be associated with feelings that are: FRIENDLY, AFFECTIONATE, INSPIRED, HOPEFUL, OPTIMISTIC, INTERESTED and EXPECTANT.

ZONE 12 (Quadrant F): Movement between y=0 to −3; z=0 to 3 and with x=0: Negative Polarity, Neutral Activity, Positive Receptivity (down-stretch). A negative affect that is open, with neutral activity, express vulnerability, in emotions described as: TIMID, SORRY, MISUNDERSTOOD, DESPONDENT, UPSET and DEVASTATED.

ZONE 13 (Quadrant G): Movement between y=0 to 3; z=0 to −3 and with x=0: Positive Polarity, Neutral Activity, Negative Receptivity (up-pinch). A positive affect with a less vulnerable attitude and neutral energy may be characterized by expressions that are: ASSESSING, SELF-CONFIDENT, SNICKERING and IMPISH.

ZONE 14 (Quadrant H): Movement between y=0 to −3; z=−0 to 3 and with x=0: Negative Polarity, Neutral Activity, Negative Receptivity (down-pinch). Emotional states that are of a down effect and unreceptive attitude can be interpreted as: GRUMPY, SIMMERING, CHAGRINED, DISAPPROVING, RESENTFUL and FOILED.

Figure 3:
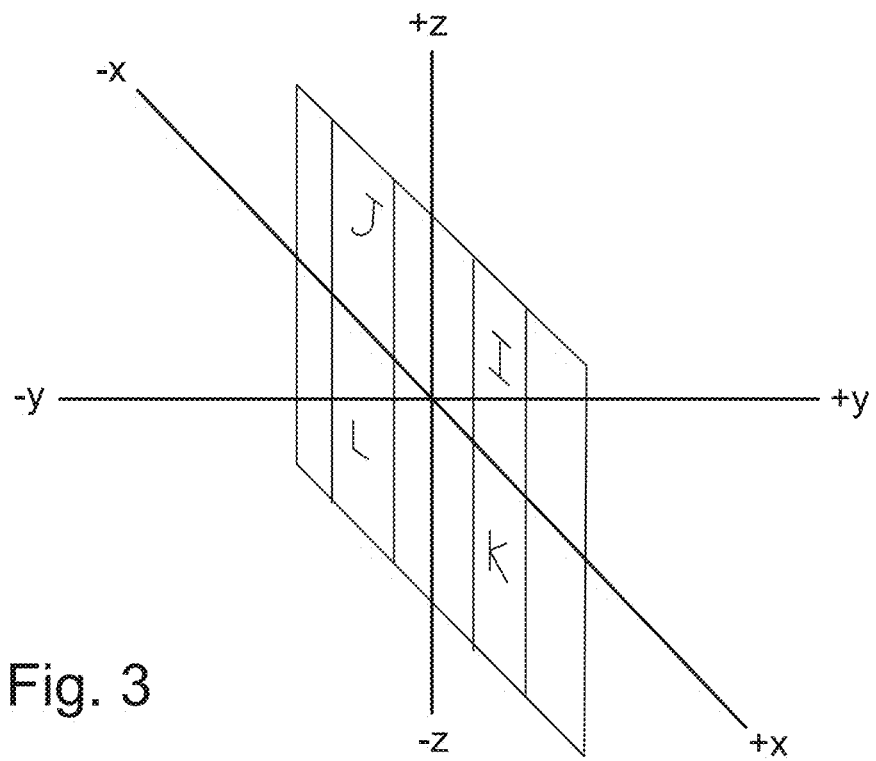

FIG. 3 depicts the four quadrants (I-L) where the value of the Polarity(y) coordinate is zero.

ZONE 15 (Quadrant I): Movement between x=0 to 3; z=0 to 3 and with y=0: Neutral Polarity, Positive Activity, Positive Receptivity (right-stretch). Energized and open feelings of neutral affect may include feeling: SURPRISED, CLUELESS, BAFFLED and STARTLED.

ZONE 16 (Quadrant J): Movement between x=0 to −3; z=0 to 3 and with y=0: Neutral Polarity, Negative Activity, Positive Receptivity (left-stretch). Open feelings that are either low in arousal or inwardly directed may be expressed as: EVASIVE, LAZY, LONGING, MELANCHOLIC, REVERENT, IMPASSIONED, RELIEVED and BLANK.

ZONE 17 (Quadrant K): Movement between x=0 to 3; z=0 to −3 and with y=0: Neutral Polarity, Positive Activity, Negative Receptivity (right-pinch). Feelings may be expresses as: CONCENTRATING, CONFUSED, FLABBERGASTED, ANNOYED, INDIGNANT, DEFIANT and CONTMPTUOUS.

ZONE 18 (Quadrant L): Movement between x=0 to −3; z=0 to −3 and with y=0: Neutral Polarity, Negative Activity, Negative Receptivity (left-pinch). Feeling may be express as: SKEPTICAL, DROOPY, HAUGHTY, INSULTED, VINDICTIVE and SUSPICIOUS.

Octants

The final eight zones are cubical octants depicted in FIG. 1 as octants I-VIII. In the octants each coordinate may vary from 0 to 3 or from 0 to −3.

ZONE 19 (Octant I): Movement between x=0 to 3; y=0 to 3; z=0 to 3: Positive Polarity, Positive Activity, Positive Receptivity (up-right-stretch). This octant, full of upbeat energy and acceptance, contains highly favorable emotions that are: AMUSED, ENTERTAINED, ELATED, UPBEAT, ASTONISHED, CURIOUS, IMPRESSED, ADMIRATION, EAGER, HAPPY, AMAZED, OVERJOYED and HILARIOUS LAUGHTER.

ZONE 20 (Octant II): Movement between x=0 to 3; y=0 to −3; z=0 to 3: Negative Polarity, Positive Activity, Positive Receptivity (down-right-stretch). With negative polarity, higher energy and openness translate to vulnerability that express being: WORRIED, APPREHENSIVE, NERVOUS, PANICKED, DISTRESSED, ALARMED, SHOCKED, SCARED and TERRIFIED.

ZONE 21 (Octant III): Movement between x=0 to −3; y=0 to 3; z=0 to 3: Positive Polarity, Negative Activity, Positive Receptivity (up-left-stretch). Low energy combined with positive feeling and openness produce a range of blissful and contented feelings, such as: DEMURE, AMOROUS, FACIAL SHRUG, HOPEFUL, DAYDREAMY, SWOONING, RAPTUROUS, CONTENTED, PEACEFUL, PASSIONATE, WARM, INNOCENT, REFRESHED, RELAXED, COMPASSIONATE, GRATEFUL, AFFECTIONATE, MISTY and TEARS OF JOY.

ZONE 22 (Octant IV): Movement between x=0 to −3; y=0 to −3; z=0 to 3: Negative Polarity, Negative Activity, Positive Receptivity (down-left-stretch). Vulnerable, enervated and downhearted dynamics yield a range of hurt or wounded feelings, from the borderline disappointment to the extremely grieved, and including: DISAPPOINTED, FUDDLED, MEH, MELODRAMATIC, LONELY, GLUM, REJECTED, SYMPATHETIC, BEREFT, EMBARRASSED, ANGUISHED, REMORSEFUL, AGONIZED, DESPAIRING and GRIEF.

ZONE 23 (Octant V): Movement between x=0 to 3; y=0 to 3; z=0 to −3: Positive Polarity, Positive Activity, Negative Receptivity (up-right-pinch). An upbeat affect and energy, combined with a invulnerable attitude, encompass a range of expressions that could be viewed as: BRAVADO, QUERYING, PUCKISH, CONFIDENT, CONCEITED, BOLD, BRASH, TRIUMPHANT, STIFLED LAUGH, DETERMINED, DEFIANT and AGGRESSIVE.

ZONE 24 (Octant VI): Movement between x=0 to −3; y=0 to 3; z=0 to 3: Positive Polarity, Negative Activity, Negative Receptivity (up-left-pinch). A smiling affect with an inward-directed energy and closed attitude produces perhaps the most intriguing mix of emotions. These are mostly "false" emotions—cynical, subversive, duplicitous. Selfish. These mixed emotional states might be described variously as: CHEESY, SIMPERING, DEBAUCHED, SEDUCTIVE, ALOOF, ARCH, CONDESCENDING, FALSE SMILE, FALSE LAUGH, PASSIVE-AGGRESSIVE, SMUG, SUPERIOR, HAUGHTY, SNIDE, SLY, SNEAKY, LEERY, DEVILISH, MOCKING, JEERING and MALEVOLENT LAUGH.

ZONE 25 (Octant VII): Movement between x=0 to 3; y=0 to −3; z=0 to −3: Negative Polarity, Positive Activity, Negative Receptivity (down-right-pinch). Oppositional and negatively disposed, the active energy brings out angry feelings you might consider: COLD, OUTRAGED, GRUMPY, TAKEN ABACK, DISGRUNTLED, OFFENDED, INDIGNANT, SNEERING, IMPATIENT, FUMING, AGGRAVATED, STRESSED, RILED, GLARING, FRUSTRATED, EXASPERATED and ENRAGED.

ZONE 26 (Octant VIII): Movement between x=0 to −3; y=0 to −3; z=0 to −3: Negative Polarity, Negative Activity, Negative Receptivity (down-left-pinch). This zone contains the negative extremes of each dimension and typified by bitterness and resentment, in all its related forms, which may be described variously as: SICKENED, SULLEN, POUTING, SULKY, BORED, PARANOID, BITTER, ENVIOUS, WINCING, DISDAINFUL, REPELLED, GROSSED OUT, PAINED, JEALOUS, DISGUSTED and HATEFUL.

Figure 4:
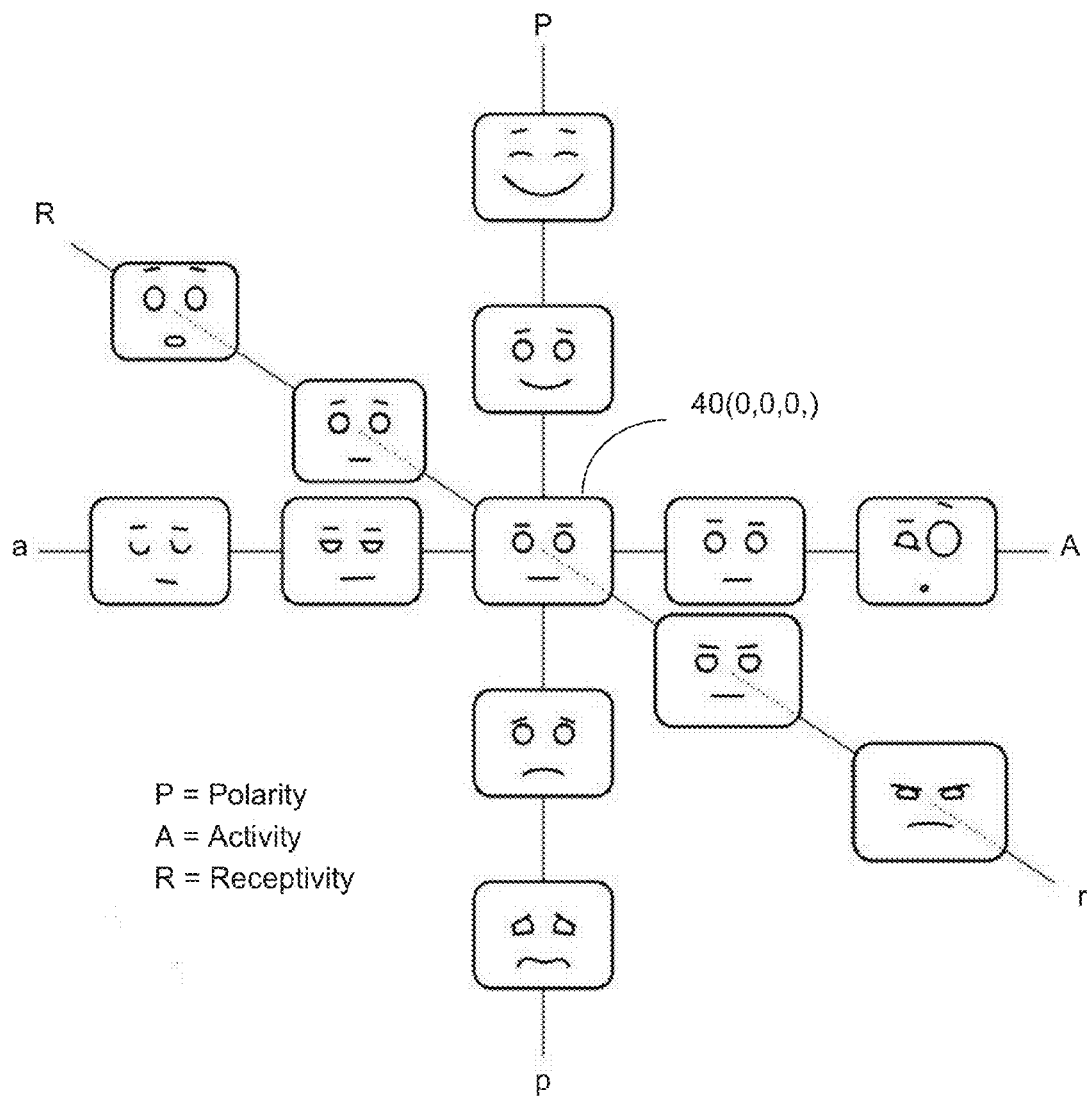
FIG. 4 is an illustration of facial expression images expression emotional states on the axes of a 3-dimensional emotional state matrix.

FIG. 4 depicts the axial components of the facial expression image matrix and how the components affect the facial expression images. FIG. 4 depicts the Activity(x) axis, Polarity(y) axis and Receptivity(z) as depicted in FIG. 1 with the coordinate values of each axis in the range of −2 to +2. Facial expression images $40(x,y,z)$ are assigned to each to each coordinate value triplet (x,y,z). A neutral facial expression image $40(0,0,0)$ is assigned to the origin. In FIG. 4 facial expression images 40 are depicted only for coordinates along one of the axes.

In this example embodiment, each facial expression image $40(x,y,z)$ is formed on a rectangular background shape and includes graphic indicia indicating a mouth, a pair of eyes and a pair of eyebrows. The shape and position of the mouth, pair of eyes and pair change for different coordinate values of Activity, Polarity and Receptivity.

For example, increasing the Positive polarity coordinate value increases the polarity component and causes the facial expression image toward something more resembling a smile and increasing the negative polarity coordinate value decreases the polarity component and directs the facial expression image in the opposite direction. Increasing the Positive receptivity coordinate value increases the receptivity component and causes a more open facial expression image and increasing the negative receptivity coordinate value decreases the receptivity component and causes a more closed or compressed facial expression image. Increasing the Positive activity coordinate value increases the activity component and adds energy to the facial expression image and increasing the negative activity coordinate value decreases the activity component and saps energy from the facial expression image.

Figure 5:
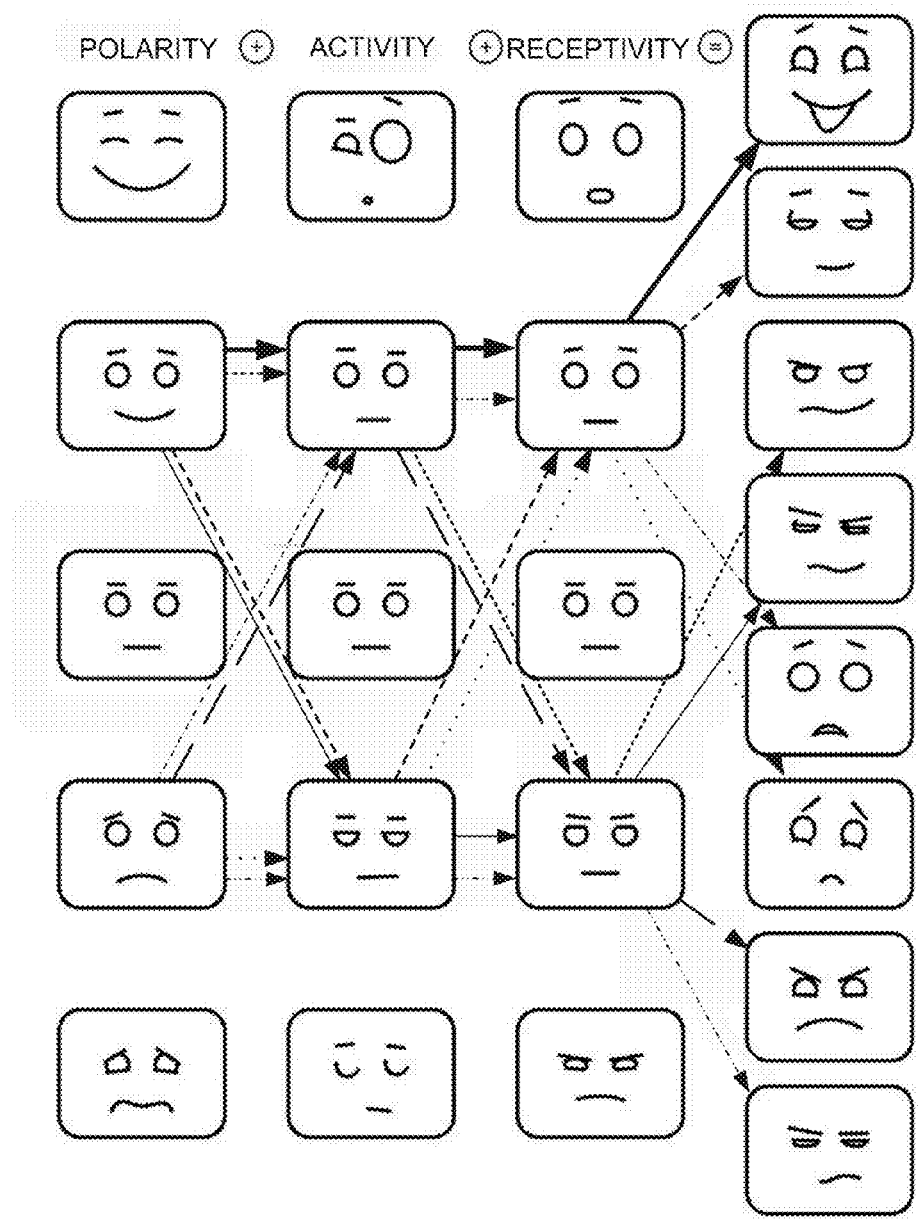
FIG. 5 is an illustration of off-axis facial expression images.

FIG. 5 depicts examples of off-axis facial expression images for interactive emotional states where the value of more than one component is non-zero. When the components interact, the energy can change (e.g. passive aggression). FIG. 5 shows some examples of expressions that result from the interactions of all three components. A sample is shown from each of the eight octants of the facial expression image matrix depicted in FIG. 1

Figure 6A:
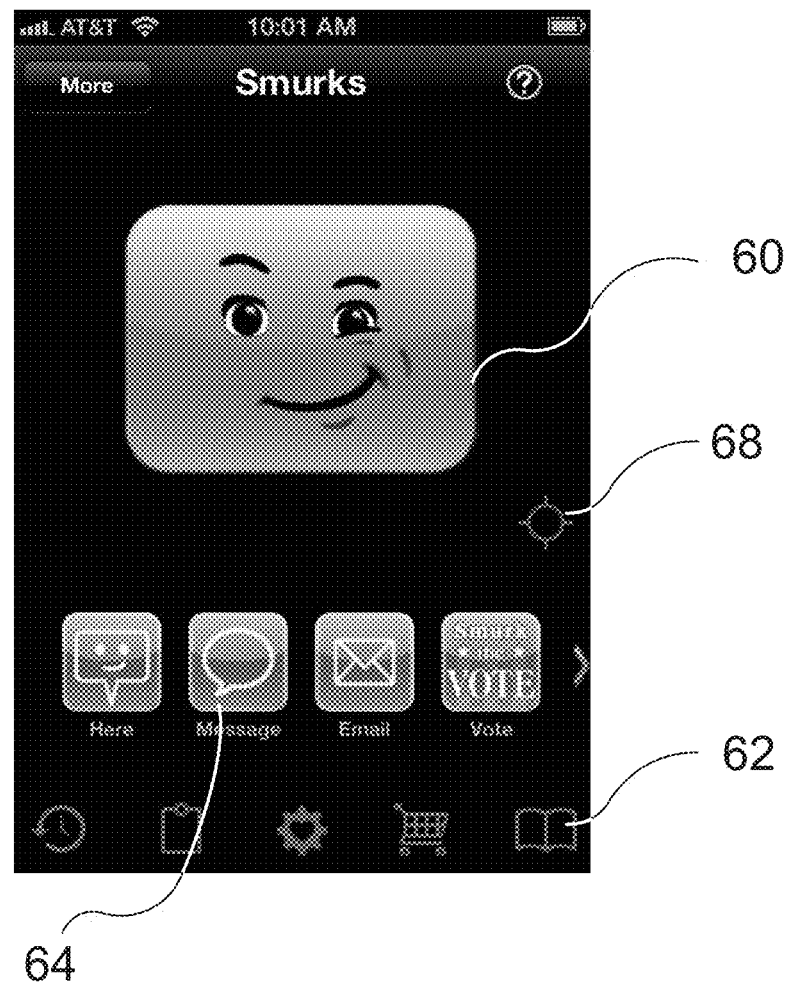
FIG. 6A is an illustration of an example user interface for navigating between facial expression images.

FIG. 6A depicts an example embodiment of a graphical user interface (GUI) for selecting a facial expression image to correspond to an emotional state.

In this example, the user is initially presented with a single neutral expression that represents the middle point of the matrix. In FIG. 6A the user has navigated to a facial expression image 60 expressing an emotional state. Navigation is via user gestures on top of the displayed facial expression image. Swiping the user's finger up, for example, moves to a facial expression image with a higher y value, which corresponds to happier, more positive, emotion. Swiping down moves to a less happy, more negative, image. Swiping to the left corresponds to a lower x value, which is a more passive emotion, while swiping to the right corresponds to a more active emotion. Pinching on the image lowers the z value, corresponding to a more closed, squashed expression. Spreading the fingers apart, on the other hand, increases the z level, and moves to a more open, stretched expression.

Since interactive navigation causes the displayed facial expression image to be rapidly replaced with the facial expression image corresponding to the underlying coordinate as the user navigates around the matrix, the result is that the user sees what appears to be a single facial expression image, morphing between various emotional states, as the user moves around the space. This makes for an enjoyable, intuitive, and easy to use navigation system.

When the user finds the desired image, then pressing and holding on the image will cause a small version of the image to appear to float under the user's finger. Continuing to press and dragging that floating image will allow the user to release and drop the image on another part of the interface, such as the Bookmarks icon 62 or a posting outlet icon 64, such as FaceBook or Twitter. A convenient feature is that, as seen above, the outlet can display a small version of the image of the most recently-posted facial expression image. A crosshair icon 68, the function of which is described below, is also displayed in this example.

A user can send the selected facial expression image to one or more other people by dragging the facial expression image to one of the available outlet icons. The pre-defined outlets in an example embodiment included Twitter, Face Book, email, SMS text, and the clipboard. Dragging to Twitter, or Face Book would cause a comment window to pop up, where the user could add an optional comment prior to posting the facial expression image. Dragging to SMS text or email would open the native interfaces for editing a message, with the facial expression image embedded in the message. And dragging to the clipboard would copy the facial expression image so it could be pasted into any app that allows pasting of images.

An example preferred embodiment of the Smurks® app allows for the creation of configurable outlets. This allows for new outlets to be loaded from an Smurks®—system server, and saved for use on the local user's system. Since this facility allows for an unlimited number of potential outlets, an interface is provided to allow the user to scroll through a user-configurable list of outlet icons (as seen above). This enables the Smurks® system to become a tool for rating almost anything conceivable with an emotional tag that can be quantifiable across large populations and demographic groups to better capture and characterize the emotions elicited by various stimuli (objects, concepts, people, places, ideas, beliefs, appliances, electronic devices, clothing, etc.).

Figure 6B:
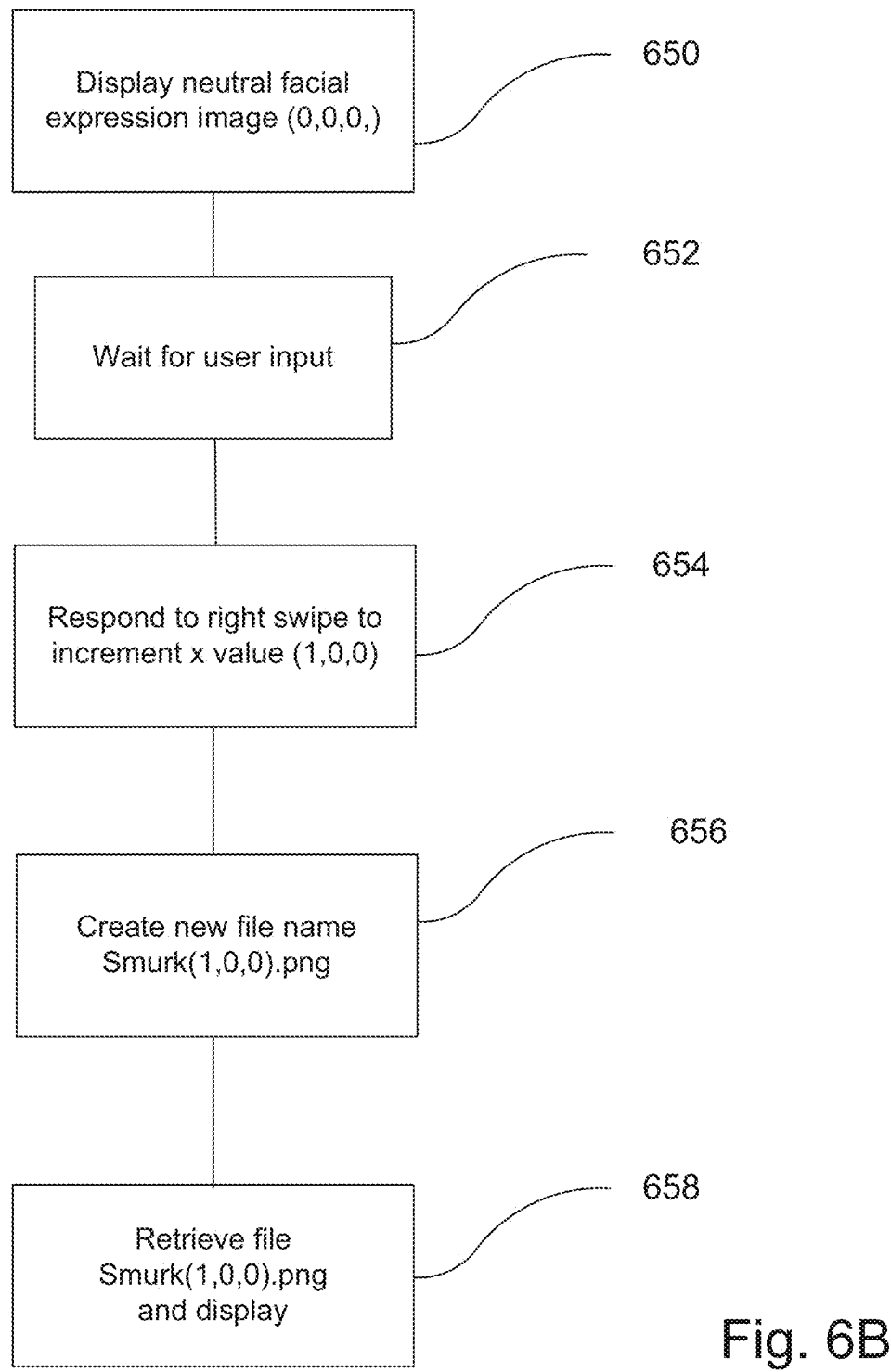
FIG. 6B is an example flow chart depicting a method of navigating between facial expression images.

FIG. 6B is a flow chart depicting software steps utilized to implement an example embodiment. In this example, the software is executed on an iPhone® and utilizes the iOS. Each facial expression image is stored as a Portable Network Graphics (png) image in a file system and has a file name including an (x,y,z) triplet where x, y, and z are integer coordinate values.

At process step 650 the program starts up and displays a neutral facial expression image where the value of the triplet is (0,0,0) and at process step 652 the program waits for user input. In some embodiment, the last facial expression image displayed during a previous use of the program is initially displayed.

At process step 654 the software responds to a user input of swiping the displayed neutral facial expression image to the right to increment the x value of the triplet to form an updated triplet equal to (1,0,0).

At process step 656 the software creates a new file name including the updated triplet and at process step 658 the software retrieves the image file having the new file name and displays the facial expression image.

The process for responding to an up swipe and pinch and stretch are similar and will not be described in detail.

Similar techniques can be used with other operating systems and also will not be described in detail.

Figure 7:
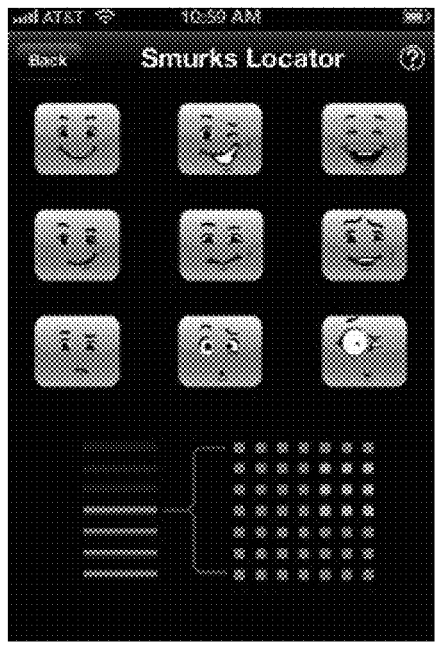
FIGS. 7 and 8 are illustrations of example user interfaces for depicting neighboring facial expression images in the 3-dimensional emotional state matrix.
Figure 8:
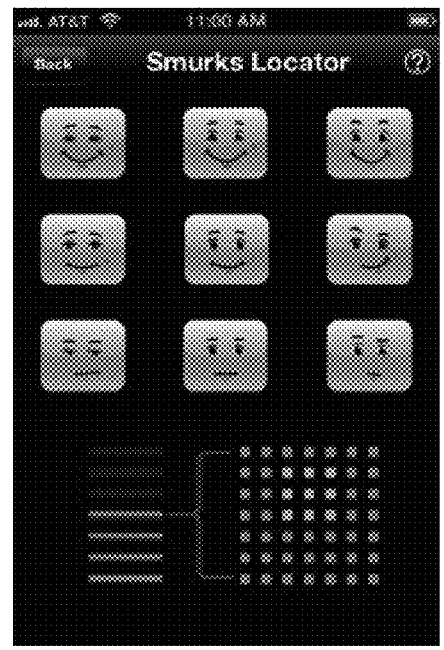

Sometimes, navigating via the main screen can cause the user to lose loose spatial awareness of where the current position is within the space of the entire matrix. FIGS. 7 and 8 depict an example of navigation user interface that display neighboring facial expression images in the facial expression image matrix of a displayed facial expression image. In this example the navigation user interfaces are accessed using the crosshair icon 66.

The navigation user interface is depicted in FIGS. 7 and 8. A group of nine facial expression images in the (Activity(x), Polarity(y)) plane of Receptivity(z) at a constant value is displayed. In this example each coordinate value varies from −3 to +3. A set of bars 82 is used to select the Polarity(z) coordinate value and a grid of squares 84 represents the forty-nine facial expression images of a selected (Activity(x), Polarity(y)) plane. Touching different areas of the grid selects which 3×3 subset of the forty-nine facial expression image in the plane to display.

Figure 9:
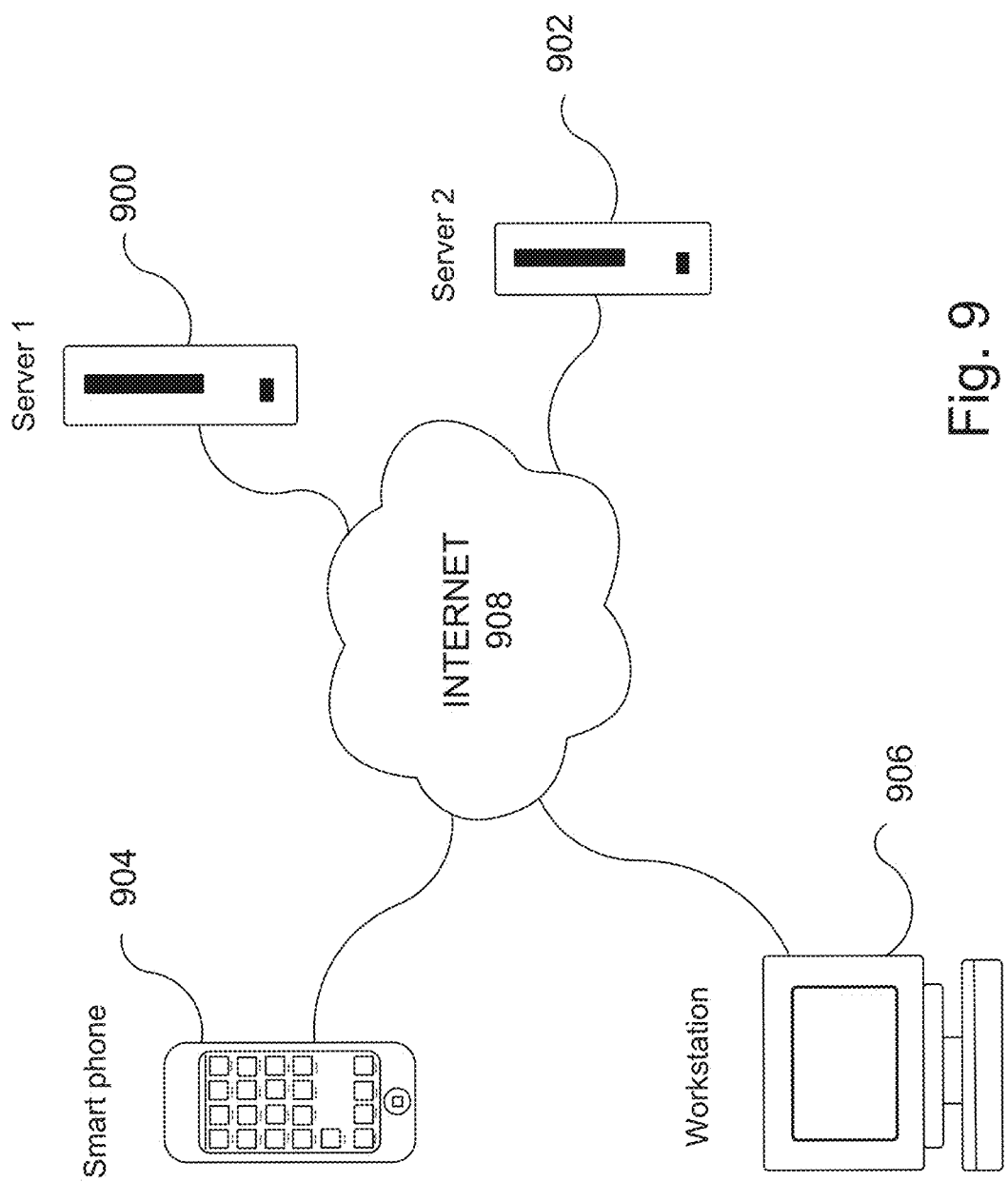
FIG. 9 illustrates an embodiment implemented over a network.

FIG. 9 depicts an example embodiment having a Smurks® server 900 coupled to other servers 902, mobile devices 904 and computers 906 over a network 908 such as the Internet. In this example, program code and data for implementing the Smurks® system is transferred from the server to a mobile device or computer.

The implementation of the transfer uses existing technology and will not be described in detail. If the mobile device were an iPhone® then the iTunes® system could be used to transfer the program code and data for implementing the Smurks® system.

In some embodiments, described in more detail below, the program code transferred to a mobile device or computer includes code for sending messages to the server and receiving messages from the server.

A first use of the Smurks® system is to express the user's current emotional state and communicate this current emotional state to others using outlets such as Facebook, Twitter, email and so on.

A second use is to allow the user to express an emotional state induced by an external stimulus.

For an example, the Smurks® system can be used as a rating system for user experiences at restaurants, stores and other commercial entities. An important feature in implementing such a rating system is allow a user to express an emotional response triggered by an experience and to facilitate analysis of many responses to generate an average value facial expression image to rate the experience.

The Smurks® system is used to express a customer's emotional state about a restaurant, a bar, a boutique, a post office, or wherever else the customer happens to be (either using, for example the FourSquare® database or simply tagging geo-coordinates with a facial expression image) and programs running on the Smurks® system server compute an average facial expression image of those positions that can be consulted as an emotional rating system.

One example for rating experiences uses a pre-defined outlet in the Smurks® app corresponds to a GPS function in the iPhone®, so that, when a user drops a facial expression image on that outlet icon, the system will determine the current geospatial location of the user's phone, and can respond in a variety of ways, including, but not limited to: 1) storing the facial expression image and associated location in a local database on the phone, 2) send the facial expression image and associated location to an aggregator server that will store them, together with an anonymized user ID, for further analysis and aggregation with facial expression image posts from other users, or 3) compare the geospatial location with a list of registered facial expression images outlets, either on the user's phone or on a remote server, to find an existing outlet that falls within a configurable threshold distance from the user's location, so that that particular facial expression image post can be automatically correlated with that existing registered outlet and posted thereto. In this way, for example, a user at a restaurant can drag a facial expression image to the GPS icon, and, if an outlet has been already registered for that restaurant, the facial expression image will be automatically posted to that outlet.

Another important use of the Smurks® system is to perform market research or sample public opinion. Quantifying emotional response has been an elusive pursuit in market research. Existing available tools offer a menu of emotions (most of them negative), and responders choose from that limited menu (most are verbal, but one or two have visual support), and the results are tabulated in bar or pie charts.

The Smurks® system has a much wider and deeper menu, with as many positive as negative choices (though some of the snarky options aren't entirely positive (but the attempt to project positivity offers useful information)), and can present the results as a single facial expression image expressing an averaged emotional state.

The Smurks® system can be used in the same way for public opinion polling or even for monitoring the general emotional well being of a population. An important advantage is that there is no "perfect" Smurks® system rating, such as a five out of five stars. On some things, say a tragic romantic movie, a desired response would be a sad or weepy facial expression image response or for a horror movie the desired response might want a scared facial expression image or the makers of a serious documentary might be thrilled to see an angry facial expression image in response to their film.

The up-left-pinch octant, ZONE 24(Octant 6) of FIG. 1, contains many expressions that are snide or sarcastic (or both). Similar expressions are smug or simply false, as in false smiles or laughs that may be mocking or malicious. They assume a position of superiority and are resistive (passively oppositional). These false and sarcastic facial expressions are difficult to impossible to express using a standard mood map that measures emotional states in terms of Valence and Intensity. The third dimension of Receptivity is necessary to allow such expressions to fit into single same map that also expresses more sincere emotional states. Thus using a snarky zone, such as zone 24, it is possible to test a funny commercial to see if respondents are laughing with you or at you.

It has been discovered that Receptivity axis provides a useful tool for market research. Emotional responses that fall in the more receptive zone, whether or not their Polarity is extremely positive, can indicate a greater openness to the message and a greater willingness to buy.

Figure 10:
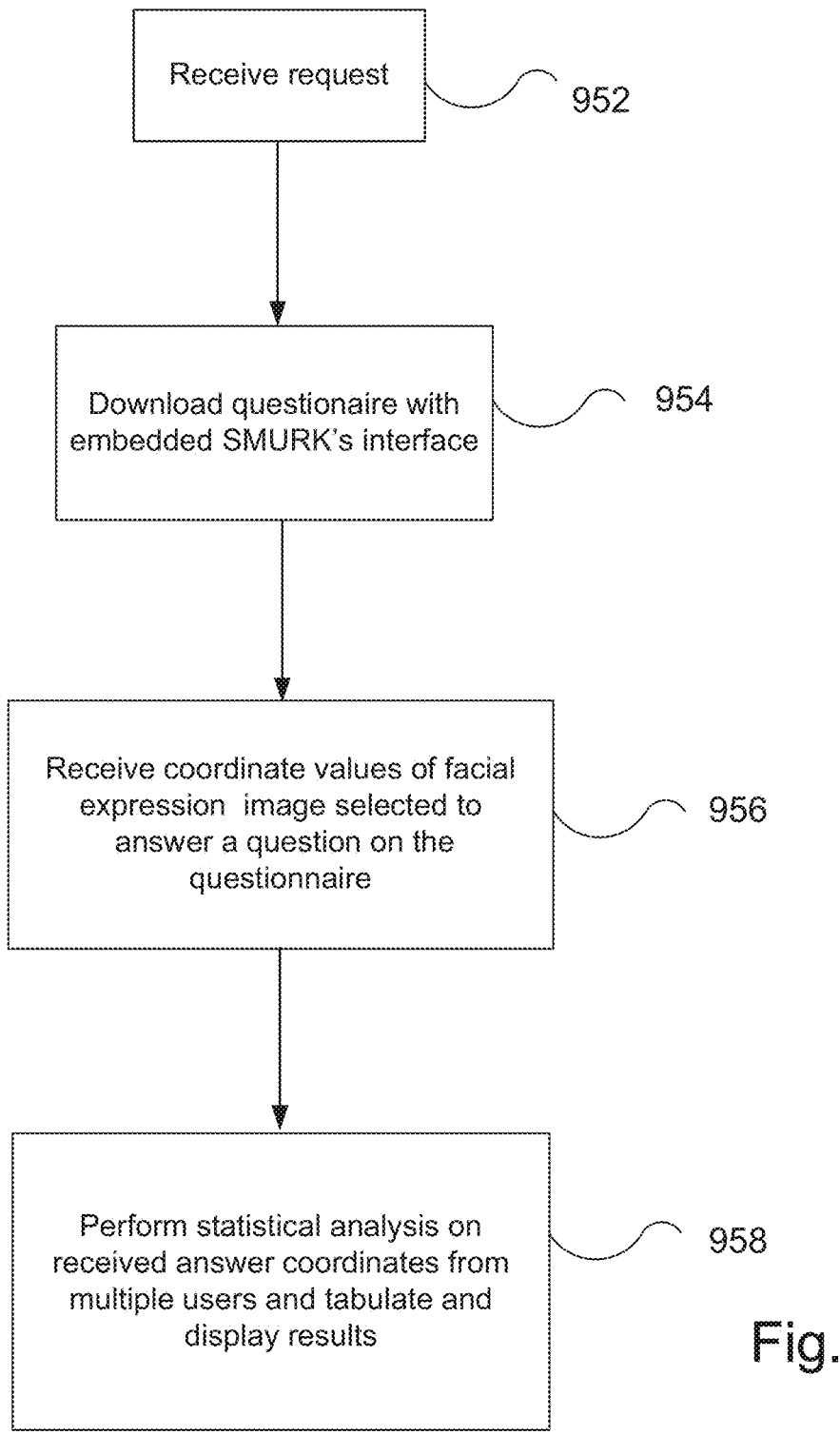
FIG. 10 is an example flowchart of a method of obtaining emotional state responses to questionnaires.

A market research example embodiment will now be described with reference to FIG. 10. In process step 952 the server receives a request to transfer a market research questionnaire to a mobile device or computer of an intended respondent to the questionnaire.

In process step 954 the server transfers a Smurks®-system-enabled questionnaire to the intended respondent. The questionnaire includes an embedded SMURK-system interface that will allow a user to express an emotional reaction as an answer to a question or reaction to some other stimulus.

In some embodiments the program code for implementing the Smurks® system will be transferred along with the questionnaire. For example, in a web browser context a plug-in application could be utilized to implement the Smurks® system. In other example embodiment the SMURKS® system will be resident on the mobile device or computer and the questionnaire will include program code for interacting with the resident program code.

In program step 956 the server receives a triplet identifying the facial expression image selected by the respondent to express the emotional state experienced in response to the question or stimulus provided.

In program step 958 the server performs statistical analysis on multiple responses.

In other example embodiment, distributed processing is used where program code and data may be stored in any device coupled to the network and execution of program code may take place on different servers and computer coupled to the network and communication with each other.

Figure 11:
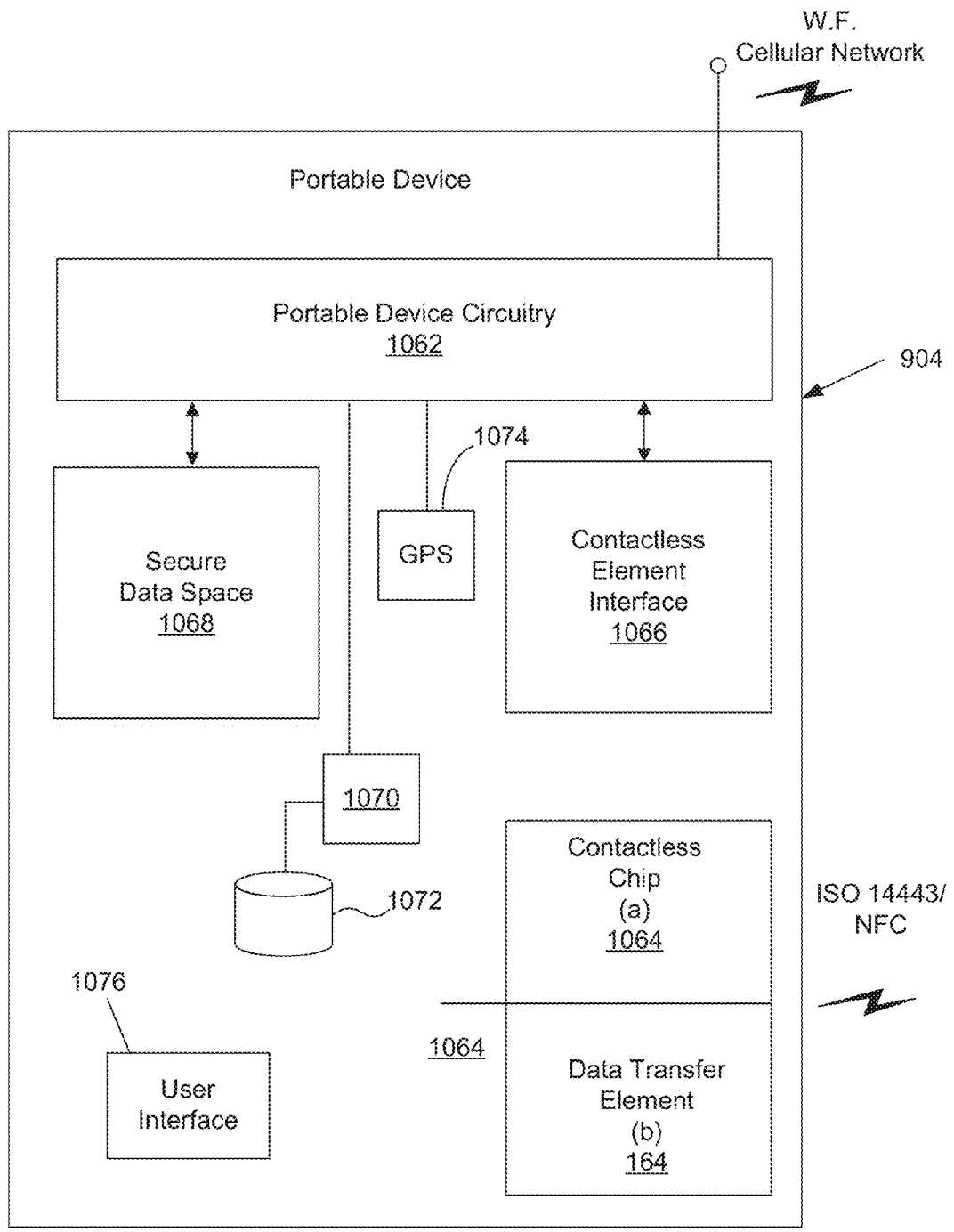
FIG. 11 is a block diagram of an example portable multi-functional device.
Figure 12:
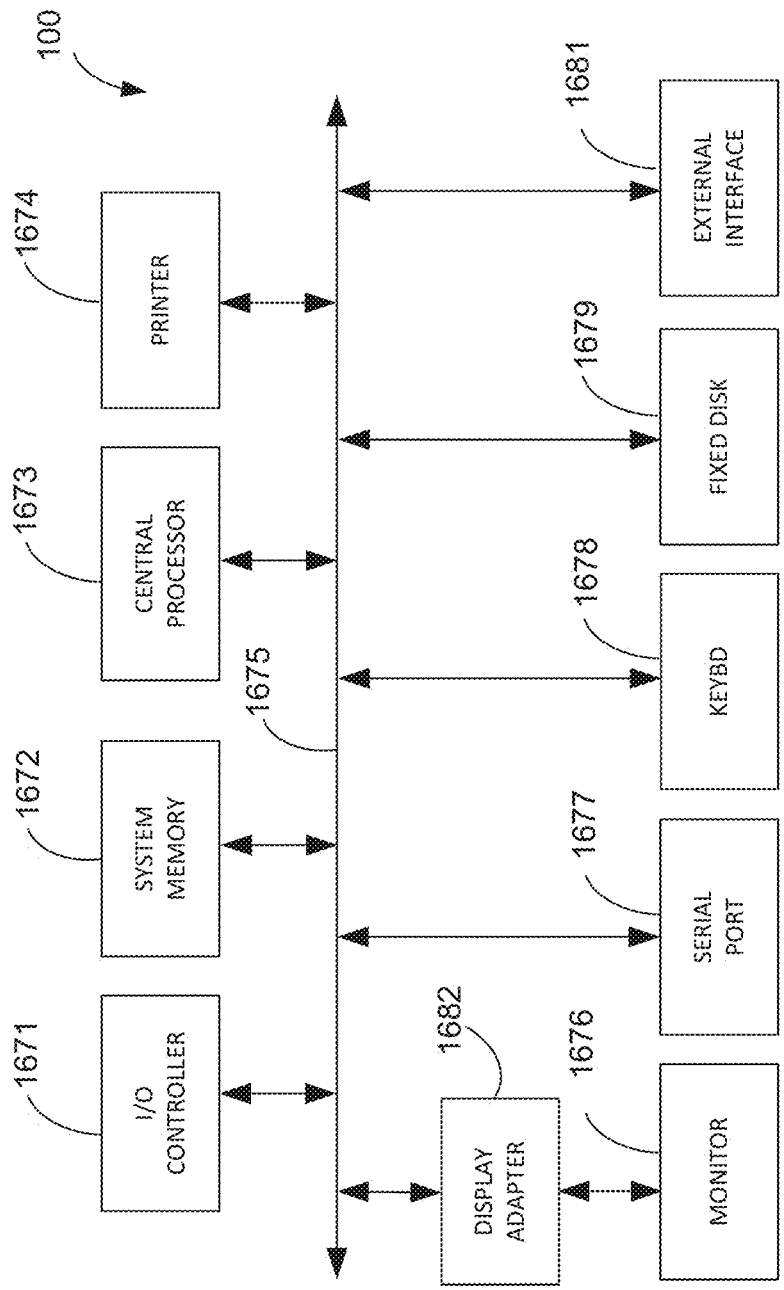
FIG. 12 is a block diagram of an example server computer.

FIG. 11 shows an enlarged view of the portable (mobile) multifunctional device 904 such as a smart phone. For example, if the portable multifunctional device 904 is a cellular telephone, then the portable device circuitry includes a communication link that may support protocols such as Global System for Mobile communication (GSM), General Packet Radio Service (GPRS), Enhanced Data Rates for Global Evolution (EDGE), Universal Mobile Telecommunications Service (UMTS), etc. The communication interface of the device 904 may also/alternately support Wireless Wide Area Network (WWAN), Wireless Local Area Network (WLAN), and/or Wireless Personal Area Network (WPAN), etc.

Device 904 may further include a contactless element 1064, typically implemented in the form of a semiconductor chip 164(a) with an associated wireless data transfer (e.g., data transmission) element 1064(b), such as an antenna. Contactless element 1064 is associated with (e.g., embedded within) portable device 904 and data such as a coupon or control instructions transmitted via cellular network may be applied to contactless element 1064 by means of contactless element interface 1066. Contactless element interface 1066 functions to permit the exchange of data and/or control instructions between the portable device circuitry 1062 (and hence the cellular network) and contactless element 1064.

The contactless element may also include a Near Field Communication (NFC) module or other near field wireless reader module that allows the portable multifunctional device to communicate with a point of sale terminal (POS) at a merchant location by tapping the portable multifunctional device to a reader.

Contactless element 1064 is capable of transferring and receiving data using a near field communications capability (or near field communications medium) typically in accordance with a standardized protocol or data transfer mechanism (identified as ISO 14443/NFC in the figure). Near field communications capability is a short-range communications capability, such as RFID, infra-red, or other data transfer capability that can be used to exchange data between the portable device 904 and a local apparatus by tapping the portable device to the local apparatus, for example located at point-of-sale of a merchant or another location at which coupons are expected to be redeemed. Thus, portable device 104 is capable of communicating and transferring data and/or control instructions via both cellular network and near field communications capability.

Portable device 904 may also include a secure data space 1068, which may be used by the device to store operating parameters and/or other data utilized in operation of the device. The secure data space 1068 may be in the form of a chip that is separate and apart from the chip in the contactless element 1064, or alternatively, could be a section of memory in the chip that forms part of the contactless element 1064. Note that the chip in the contactless element 1064 may include data storage capability in the form of a memory that may be accessed via interface 1066 to permit the implementation of read, write, and erase functions, for example.

In accordance with still other embodiments, the portable device may further include a processor 1070 and computer readable storage medium 1072 for storing code and configured to direct the processor to perform various tasks. For example, the computer readable storage medium may comprise a magnetic disk drive or a flash memory chip. A smart phone includes an operating system such as Google Android or Apple iOS operating system.

The computer readable storage medium may contain code that is configured to cause a processor of the portable consumer device to receive and recognize a message including a coupon and code that is delivered to the portable device. The computer readable storage medium may also include code that is configured to decrypt an encrypted message including the code that is received by the portable device.

In accordance with certain embodiments, the portable device 904 further includes a Global Positioning System (GPS) element 1074. GPS element 1074 is configured to allow determination of the location of the user at any time. In particular, GPS element 1074 relies upon signals from a plurality of orbiting satellites in order to allow the user's location to be determined. Location information obtained from the GPS element 1074 may in turn be communicated through the antenna to allow monitoring of the user's position. The GPS receiver determines a geographic location for the device by calculating a distance between the device and at least three satellites using low-power radio signals received from the satellites using a technique known as Trilateration, which is known in the art.

The portable multifunctional device includes an input interface 1076 such as, for example, a touch screen, keypad (which for present purposes will be understood to include the other buttons, switches and keys referred to or may be implemented as soft keys on the display) for receiving user input, a display component for displaying output information to the user and conventional receive/transmit circuitry. Other suitable input interfaces include a light pen, track ball, data glove, microphone, etc. The portable multifunctional device also includes an input/output interface that may include a keypad, a mouse, a screen, a touch screen, and/or any other type of interface that allows a user of the device to interact with the device.

FIG. 11 is an illustration of basic subsystems in server system 800 of FIG. 9. This diagram is merely an illustration and should not limit the scope of the claims herein. One of ordinary skill in the art will recognize other variations, modifications, and alternatives. In certain embodiments, the subsystems are interconnected via a system bus 1675. Additional subsystems such as a printer 1674, keyboard 1678, fixed disk 1679, monitor 1676, which is coupled to display adapter 1682, and others are shown. Peripherals and input/output (I/O) devices, which couple to I/O controller 1671, can be connected to the computer system by any number of means known in the art, such as serial port 1677. For example, serial port 1677 can be used to connect the computer system to an external interface, such as a modem, 1681, which in turn connects to a wide area network such as the Internet, a mouse input device, or a scanner. The interconnection via system bus 1675 allows central processor 1673 to communicate with each subsystem and to control the execution of instructions from system memory 1672 or the fixed disk 1679, as well as the exchange of information between subsystems. Other arrangements of subsystems and interconnections are readily achievable by those of ordinary skill in the art. System memory and the fixed disk are examples of tangible media for storage of computer programs. Other types of tangible media include floppy disks, removable hard disks, optical storage media such as CD-ROMS and bar codes, and semiconductor memories such as flash memory, read-only-memories (ROM), and battery backed memory.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. An apparatus for visually depicting an emotional state, the apparatus comprising:
    a computing system including a processor coupled to a display screen and one or more user input devices with the processor configured to:
        display a first facial expression image on the display screen, with the first facial expression image in the form of a background shape having graphic indicia of facial features displayed within the background shape, where facial features indicated by the graphic indicia include at least a mouth, a pair of eyes and a pair of eyebrows,
    with the first facial expression image expressing an emotional state characterized by interaction of a polarity state, an activity state and a receptivity state, and
    with the first facial expression image stored in a first graphics file in a file system including a plurality of graphics files, and with each graphics file in the plurality indexed by a coordinate index value triplet having coordinate index values representing coordinate values of a multi-dimensional space, and where a polarity coordinate index value defines a polarity axis of a continuum of polarity states and indicates a discrete polarity state on the polarity axis, an activity coordinate index value defines an activity axis of a continuum of activity states and indicates a discrete activity state on the activity axis, and a receptivity coordinate index value defines a receptivity axis of a continuum of receptivity states and indicates a discrete receptivity state on the receptivity axis, where a different facial expression image is stored in each graphics file indexed by a coordinate index value triplet, where at least one of location and shape of at least one of the mouth, pair of eyes, and pair of eyebrows are different for facial expression images stored in graphics files indexed by different coordinate index value triplets, and where a facial expression image stored in a graphics file expresses an emotion corresponding to interaction of the polarity, activity and receptivity states indexed by the coordinate index value triplet;

accept input signals from one of the user input devices indicating selected polarity, activity and receptivity coordinate index values;

display a second facial expression image, stored in a second graphics file in the plurality, the second graphics file indexed by the selected coordinate index values, that expresses a particular emotional state, with the selected polarity coordinate index value navigating between graphics files storing facial expression images expressing emotional states that tend towards a smile at one end of the continuum of polarity states or toward a frown at the other end of the continuum of polarity states, with the selected activity coordinate index value navigating between graphics files storing facial expression images expressing emotional states that tend towards being either active or extroverted at one end of the continuum of activity states or toward being passive or introverted at the other end of the continuum of activity states, and with the selected receptivity coordinate index value navigating between graphics files storing facial expression images expressing emotional states that tend towards being harder or more pinched at one end of the continuum of receptivity states or toward being softer or more open at the other end of the continuum of receptivity states;

wherein facial expression images stored in graphics files indexed by non-negative polarity, activity and receptivity coordinate index values express emotional states characterized as AMUSED, ENTERTAINED, ELATED, UPBEAT, ASTONISHED, CURIOUS, IMPRESSED, ADMIRATION, EAGER, HAPPY, AMAZED, OVERJOYED and HILARIOUS LAUGHTER;

wherein facial expression images stored in graphics files indexed by negative polarity coordinate index values, non-negative activity coordinate index values and non-negative receptivity coordinate index values express emotional states characterized as WORRIED, APPREHENSIVE, NERVOUS, PANICKED, DISTRESSED, ALARMED, SHOCKED, SCARED and TERRIFIED;

wherein facial expression images stored in graphics files indexed by non-negative polarity coordinate index values, negative activity coordinate index values and non-negative receptivity coordinate index values express emotional states characterized as DEMURE, AMOROUS, FACIAL SHRUG, HOPEFUL, DAYDREAMY, SWOONING, RAPTUROUS, CONTENTED, PEACEFUL, PASSIONATE, WARM, INNOCENT, REFRESHED, RELAXED, COMPASSIONATE, GRATEFUL, AFFECTIONATE, MISTY and TEARS OF JOY;

wherein facial expression images stored in graphics files indexed by negative polarity coordinate index values, negative activity coordinate index values and non-negative receptivity coordinate index values express emotional states characterized as DISAPPOINTED, FUDDLED, MEH, MELODRAMATIC, LONELY, GLUM, REJECTED, SYMPATHETIC, BEREFT, EMBARRASSED, ANGUISHED, REMORSEFUL, AGONIZED, DESPAIRING and GRIEF;

wherein facial expression images stored in graphics files indexed by non-negative polarity coordinate index values, non-negative activity coordinate index values and negative receptivity coordinate index values express emotional states characterized as BRAVADO, QUERYING, PUCKISH, CONFIDENT, CONCEITED, BOLD, BRASH, TRIUMPHANT, STIFLED LAUGH, DETERMINED, DEFIANT and AGGRESSIVE;

wherein facial expression images stored in graphics files indexed by non-negative polarity coordinate index values, negative activity coordinate index values and negative receptivity coordinate index values express emotional states characterized as CHEESY, SIMPERING, DEBAUCHED, SEDUCTIVE, ALOOF, ARCH, CONDESCENDING, FALSE SMILE, FALSE LAUGH, PASSIVE-AGGRESSIVE, SMUG, SUPERIOR, HAUGHTY, SNIDE, SLY, SNEAKY, LEERY, DEVILISH, MOCKING, JEERING and MALEVOLENT LAUGH;

wherein facial expression images stored in graphics files indexed by negative polarity coordinate index values, non-negative activity coordinate index values and negative receptivity coordinate index values express emotional states characterized as COLD, OUTRAGED, GRUMPY, TAKEN ABACK, DISGRUNTLED, OFFENDED, INDIGNANT, SNEERING, IMPATIENT, FUMING, AGGRAVATED, STRESSED, RILED, GLARING, FRUSTRATED, EXASPERATED and ENRAGED; and wherein facial expression images stored in graphics files indexed by negative polarity coordinate index values, negative activity coordinate index values and negative receptivity coordinate index values express emotional states characterized as SICKENED, SULLEN, POUTING, SULKY, BORED, PARANOID, BITTER, ENVIOUS, WINCING, DISDAINFUL, REPELLED, GROSSED OUT, PAINED, JEALOUS, DISGUSTED and HATEFUL.

2. The apparatus of claim 1 with the computing system included in a hand-held mobile device and with the one or more user input devices including a touch screen and with the processor further configured to:

change the polarity value of a displayed facial expression image in response to a user swiping the displayed facial expression image in a first direction;

change the activity value of a displayed facial expression image in response to a user swiping the displayed facial expression image in a second direction;

change the receptivity value of a displayed facial expression image in response to a user pinching or stretching the displayed facial expression image.

3. One or more server computers coupled by one or more communication links to at least one remote computing system, with the remote computing system including one or more user input devices and with the one or more server computers comprising:

a memory holding emotional-state-depicting program code for execution on a remote computing system, with the emotional-state-depicting program code configured, when executed by one or more processors of the remote computing system, to cause the remote computing system to:

display a first facial expression image on the display screen, with the first facial expression image in the form of a background shape having graphic indicia of facial features displayed within the background shape, where facial features indicated by the graphic indicia include at least a mouth, a pair of eyes and a pair of eyebrows, with the first facial expression image expressing an emotional state characterized by interaction of a polarity state, an activity state and a receptivity state, and with the first facial expression image stored in a first graphics file in a file system including a plurality of graphics files, and with each graphics file in the plurality indexed by a coordinate index value triplet having coordinate index values representing coordinate values of a multi-dimensional space, and where a polarity coordinate index value defines a polarity axis of a continuum of polarity states and indicates a discrete polarity state on the polarity axis, an activity coordinate index value defines an activity axis of a continuum of activity states and indicates a discrete activity state on the activity axis, and a receptivity coordinate index value defines a receptivity axis of a continuum of receptivity states and indicates a discrete receptivity state on the receptivity axis, where a different facial expression image is stored in each graphics file indexed by a coordinate index value triplet, where at least one of location and shape of at least one of the mouth, pair of eyes, and pair of eyebrows are different for facial expression images stored in graphics files indexed by different coordinate index value triplets, and where a facial expression image stored in a graphics file expresses an emotion corresponding to interaction of the polarity, activity and receptivity states indexed by the coordinate index value triplet;

accept input signals from one of the user input devices indicating selected polarity, activity and receptivity coordinate index values;

display a second facial expression image, stored in a second graphics file in the plurality, the second graphics file indexed by the selected coordinate index values, that expresses a particular emotional state, with the selected polarity coordinate index value navigating between graphics files storing facial expression images expressing emotional states that tend towards a smile at one end of the continuum of polarity states or toward a frown at the other end of the continuum of polarity states, with the selected activity coordinate index value navigating between graphics files storing facial expression images expressing emotional states that tend towards being either active or extroverted at one end of the continuum of activity states or toward being passive or introverted at the other end of the continuum of activity states, and with the selected receptivity coordinate index value navigating between graphics files storing facial expression images expressing emotional states that tend towards being harder or more pinched at one end of the continuum of receptivity states or toward being softer or more open at the other end of the continuum of receptivity states;

wherein facial expression images stored in graphics files indexed by non-negative polarity, activity and receptivity coordinate index values express emotional states characterized as AMUSED, ENTERTAINED, ELATED, UPBEAT, ASTONISHED, CURIOUS, IMPRESSED, ADMIRATION, EAGER, HAPPY, AMAZED, OVERJOYED and HILARIOUS LAUGHTER;

wherein facial expression images stored in graphics files indexed by negative polarity coordinate index values, non-negative activity coordinate index values and non-negative receptivity coordinate index values express emotional states characterized as WORRIED, APPREHENSIVE, NERVOUS, PANICKED, DISTRESSED, ALARMED, SHOCKED, SCARED and TERRIFIED;

wherein facial expression images stored in graphics files indexed by non-negative polarity coordinate index values, negative activity coordinate index values and non-negative receptivity coordinate index values express emotional states characterized as DEMURE, AMOROUS, FACIAL SHRUG, HOPEFUL, DAYDREAMY, SWOONING, RAPTUROUS, CONTENTED, PEACEFUL, PASSIONATE, WARM, INNOCENT, REFRESHED, RELAXED, COMPASSIONATE, GRATEFUL, AFFECTIONATE, MISTY and TEARS OF JOY;

wherein facial expression images stored in graphics files indexed by negative polarity coordinate index values, negative activity coordinate index values and non-negative receptivity coordinate index values express emotional states characterized as DISAPPOINTED, FUDDLED, MEH, MELODRAMATIC, LONELY, GLUM, REJECTED, SYMPATHETIC, BEREFT, EMBARRASSED, ANGUISHED, REMORSEFUL, AGONIZED, DESPAIRING and GRIEF;

wherein facial expression images stored in graphics files indexed by non-negative polarity coordinate index values, non-negative activity coordinate index values and negative receptivity coordinate index values express emotional states characterized as BRAVADO, QUERYING, PUCKISH, CONFIDENT, CONCEITED, BOLD, BRASH, TRIUMPHANT, STIFLED LAUGH, DETERMINED, DEFIANT and AGGRESSIVE;

wherein facial expression images stored in graphics files indexed by non-negative polarity coordinate index values, negative activity coordinate index values and negative receptivity coordinate index values express emotional states characterized as CHEESY, SIMPERING, DEBAUCHED, SEDUCTIVE, ALOOF, ARCH, CONDESCENDING, FALSE SMILE, FALSE LAUGH, PASSIVE-AGGRESSIVE, SMUG, SUPERIOR, HAUGHTY, SNIDE, SLY, SNEAKY, LEERY, DEVILISH, MOCKING, JEERING and MALEVOLENT LAUGH;

wherein facial expression images stored in graphics files indexed by negative polarity coordinate index values, non-negative activity coordinate index values and negative receptivity coordinate index values express emotional states characterized as COLD, OUTRAGED, GRUMPY, TAKEN ABACK, DISGRUNTLED, OFFENDED, INDIGNANT, SNEERING, IMPATIENT, FUMING, AGGRAVATED, STRESSED, RILED, GLARING, FRUSTRATED, EXASPERATED and ENRAGED; and wherein facial expression images stored in graphics files indexed by negative polarity coordinate index values, negative activity coordinate index values and negative receptivity coordinate index values express emotional states characterized as SICKENED, SULLEN, POUTING, SULKY, BORED, PARANOID, BITTER, ENVIOUS, WINCING, DISDAINFUL, REPELLED, GROSSED OUT, PAINED, JEALOUS, DISGUSTED and HATEFUL and a controller, coupled to the memory, configured to receive a request from the remote computing system over a communication link for a transfer of the emotional-state-depicting program code and further configured to respond to the request by transferring the emotional-state-depicting program code to the remote computing system.

4. A method performed by one or more server computers coupled to a remote computing system by at least one communication link and with the one or more server computers having access to one or more computer readable storage devices and a controller and with the remote computer system including a display and one or more input devices, the method comprising:

receiving, at the controller, a request from the remote computing system for emotional-state-depicting program code stored on the one or more computer readable storage devices;

transferring, using the controller, emotional-state-depicting program code from the one or more computer readable storage devices to the remote computing system over a communication link, with the emotional-state-depicting program code configured, when executed by the one or more processors of the remote computing system, to cause the remote computing system to:

display a first facial expression image on the display screen, with the first facial expression image in the form of a background shape having graphic indicia of facial features displayed within the background shape, where facial features indicated by the graphic indicia include at least a mouth, a pair of eyes and a pair of eyebrows, with the first facial expression image expressing an emotional state characterized by interaction of a polarity state, an activity state and a receptivity state, and with the first facial expression image stored in a first graphics file in a file system including a plurality of graphics files, and with each graphics file in the plurality indexed by a coordinate index value triplet having coordinate index values representing coordinate values of a multi-dimensional space, and where a polarity coordinate index value defines a polarity axis of a continuum of polarity states and indicates a discrete polarity state on the polarity axis, an activity coordinate index value defines an activity axis of a continuum of activity states and indicates a discrete activity state on the activity axis, and a receptivity coordinate index value defines a receptivity axis of a continuum of receptivity states and indicates a discrete receptivity state on the receptivity axis, where a different facial expression image is stored in each graphics file indexed by a coordinate index value triplet, where at least one of location and shape of at least one of the mouth, pair of eyes, and pair of eyebrows are different for facial expression images stored in graphics files indexed by different coordinate index value triplets, and where a facial expression image stored in a graphics file expresses an emotion corresponding to interaction of the polarity, activity and receptivity states indexed by the coordinate index value triplet;

accept input signals from one of the user input devices indicating selected polarity, activity and receptivity coordinate index values;

display a second facial expression image, stored in a second graphics file in the plurality, the second graphics file indexed by the selected coordinate index values, that expresses a particular emotional state, with the selected polarity coordinate index value navigating between graphics files storing facial expression images expressing emotional states that tend towards a smile at one end of the continuum of polarity states or toward a frown at the other end of the continuum of polarity states, with the selected activity coordinate index value navigating between graphics files storing facial expression images expressing emotional states that tend towards being either active or extroverted at one end of the continuum of activity states or toward being passive or introverted at the other end of the continuum of activity states, and with the selected receptivity coordinate index value navigating between graphics files storing facial expression images expressing emotional states that tend towards being harder or more pinched at one end of the continuum of receptivity states or toward being softer or more open at the other end of the continuum of receptivity states;

wherein facial expression images stored in graphics files indexed by non-negative polarity, activity and receptivity coordinate index values express emotional states characterized as AMUSED, ENTERTAINED, ELATED, UPBEAT, ASTONISHED, CURIOUS, IMPRESSED, ADMIRATION, EAGER, HAPPY, AMAZED, OVERJOYED and HILARIOUS LAUGHTER;

wherein facial expression images stored in graphics files indexed by negative polarity coordinate index values, non-negative activity coordinate index values and non-negative receptivity coordinate index values express emotional states characterized as WORRIED, APPREHENSIVE, NERVOUS, PANICKED, DISTRESSED, ALARMED, SHOCKED, SCARED and TERRIFIED;

wherein facial expression images stored in graphics files indexed by non-negative polarity coordinate index values, negative activity coordinate index values and non-negative receptivity coordinate index values express emotional states characterized as DEMURE, AMOROUS, FACIAL SHRUG, HOPEFUL, DAYDREAMY, SWOONING, RAPTUROUS, CONTENTED, PEACE- FUL, PASSIONATE, WARM, INNOCENT, REFRESHED, RELAXED, COMPASSIONATE, GRATEFUL, AFFECTIONATE, MISTY and TEARS OF JOY;

wherein facial expression images stored in graphics files indexed by negative polarity coordinate index values, negative activity coordinate index values and non-negative receptivity coordinate index values express emotional states characterized as DISAPPOINTED, FUDDLED, MEH, MELODRAMATIC, LONELY, GLUM, REJECTED, SYMPATHETIC, BEREFT, EMBARRASSED, ANGUISHED, REMORSEFUL, AGONIZED, DESPAIRING and GRIEF;

wherein facial expression images stored in graphics files indexed by non-negative polarity coordinate index values, non-negative activity coordinate index values and negative receptivity coordinate index values express emotional states characterized as BRAVADO, QUERYING, PUCKISH, CONFIDENT, CONCEITED, BOLD, BRASH, TRIUMPHANT, STIFLED LAUGH, DETERMINED, DEFIANT and AGGRESSIVE;

wherein facial expression images stored in graphics files indexed by non-negative polarity coordinate index values, negative activity coordinate index values and negative receptivity coordinate index values express emotional states characterized as CHEESY, SIMPERING, DEBAUCHED, SEDUCTIVE, ALOOF, ARCH, CONDESCENDING, FALSE SMILE, FALSE LAUGH, PASSIVE-AGGRESSIVE, SMUG, SUPERIOR, HAUGHTY, SNIDE, SLY, SNEAKY, LEERY, DEVILISH, MOCKING, JEERING and MALEVOLENT LAUGH;

wherein facial expression images stored in graphics files indexed by negative polarity coordinate index values, non-negative activity coordinate index values and negative receptivity coordinate index values express emotional states characterized as COLD, OUTRAGED, GRUMPY, TAKEN ABACK, DISGRUNTLED, OFFENDED, INDIGNANT, SNEERING, IMPATIENT, FUMING, AGGRAVATED, STRESSED, RILED, GLARING, FRUSTRATED, EXASPERATED and ENRAGED; and wherein facial expression images stored in graphics files indexed by negative polarity coordinate index values, negative activity coordinate index values and negative receptivity coordinate index values express emotional states characterized as SICKENED, SULLEN, POUTING, SULKY, BORED, PARANOID, BITTER, ENVIOUS, WINCING, DISDAINFUL, REPELLED, GROSSED OUT, PAINED, JEALOUS, DISGUSTED and HATEFUL.

5. The one or more servers of claim 4 with one or more processors further configured to:

calculate an average value of the received polarity values;

calculate an average value of the received activity values;

calculate an average value of the received receptivity values; and output a facial expression image expressing an emotional state characterized by average values of the received polarity, activity and receptivity values.

* * * * *